(12) United States Patent
Jones et al.

(10) Patent No.: US 9,053,559 B1
(45) Date of Patent: Jun. 9, 2015

(54) METHOD AND SYSTEM FOR PRESENTING IMAGE DATA TO A VIDEO OUTPUT DEVICE

(75) Inventors: James Jones, San Francisco, CA (US); Jeffrey F. Juliano, Cary, NC (US); Robert Morell, San Jose, CA (US); Thomas True, Mountain View, CA (US); Ian M. Williams, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 2200 days.

(21) Appl. No.: 11/941,882

(22) Filed: Nov. 16, 2007

(51) Int. Cl.
*G06T 1/00* (2006.01)
*G09G 5/399* (2006.01)
*G06T 1/60* (2006.01)
*G06T 11/40* (2006.01)

(52) U.S. Cl.
CPC .. *G06T 1/60* (2013.01); *G06T 11/40* (2013.01)

(58) Field of Classification Search
USPC .......................... 345/522, 539, 545, 213, 534
See application file for complete search history.

(56) References Cited

U.S. PATENT DOCUMENTS

| 6,480,200 | B1 * | 11/2002 | Fisher et al. | 345/582 |
| 6,756,984 | B1 * | 6/2004 | Miyagawa | 345/473 |
| 2007/0242925 | A1 * | 10/2007 | Kikuchi et al. | 386/46 |
| 2008/0079658 | A1 * | 4/2008 | Naito et al. | 345/2.2 |

* cited by examiner

*Primary Examiner* — Hau Nguyen
(74) *Attorney, Agent, or Firm* — Artegis Law Group, LLP

(57) ABSTRACT

A method and system for presenting image data to a video output device is disclosed. One embodiment of the present invention sets forth a method, which includes the steps of queuing the buffer of image data for display, attaching an object to a command associated with presenting the buffer of image data, wherein the object is capable of storing timing information relating to executing the command, and enabling an application program to access the timing information.

20 Claims, 6 Drawing Sheets

METHOD AND SYSTEM FOR PRESENTING IMAGE DATA TO A VIDEO OUTPUT DEVICE

BACKGROUND OF THE INVENTION

1. Field of the Invention

Embodiments of the present invention relate generally to graphics processing and more specifically to a method and system for presenting image data to a video output device.

2. Description of the Related Art

Over the past decade, the cost of adding on-chip logic to processors has substantially decreased. Consequently, certain types of processors, such as advanced graphics processing units (GPUs), now include functionality not previously available in earlier GPU designs. For example, the newest GPUs are now able to perform geometry processing operations; whereas, such operations traditionally had been left to the central processing unit (CPU). One benefit of this shift in responsibilities is that more graphics processing may now be performed on the GPU instead of the CPU, thereby freeing the CPU to perform other operations.

To fully realize the capabilities of advanced GPUs, certain information needs to be exposed to an application. One example of such GPU-accessible information is the timing information associated with the display of rendered image data to a video output device. More specifically, an application program generally accesses a graphics subsystem via an Application Program Interface (API). An application utilizes the API to specify geometric primitives to the graphics pipeline implemented by the graphics subsystem, and then the resulting fragments are rendered into a framebuffer. Traditionally, this framebuffer is implemented using a double-buffered approach in order to prevent tearing while swapping between subsequent rendered images. Performance hiccups are further reduced by the addition of a queue of buffers known as a flip queue, at the cost of increased latency between image specification and subsequent display. Tearing is further reduced by doing the swap or flip during the vertical blanking interval of the attached video device. Once image specification is complete, the application program then makes a call to the API to initiate a flip operation in order to swap images in the flip queue. At this time the specified framebuffer image is then scanned out to the raster display. The graphics subsystem then proceeds to display the framebuffer but does not provide the application program with any timing information associated with the execution of the flip operation or the delay between image specification and ultimate scanout to the raster display. Therefore, the application program does not know when the scanout actually takes place. In one scenario, when the graphics subsystem falls behind in processing the incoming commands, the vertical blanking time, the time at which a flip can safely take place without image tearing is missed. The graphics subsystem then must wait until the next vertical blanking interval to perform the flip adding a significant delay between the time the command is issued and the time the framebuffer is actually displayed on the video device. Without such timing information, the application program does not know that a flip operation was missed or that it is behind by one or more frames and may need to adjust accordingly. In another scenario, in addition to image data, the graphics subsystem also handles metadata (e.g., sound data) from an external source and is required to synchronize the two before presenting the combined data to one or more output devices. Here, without any timing information from the graphics subsystem, the application program lacks the requisite intelligence to ensure synchronization of both the image data and the metadata or to recover from system performance glitches.

As the foregoing illustrates, what is needed in the art is an improved method and system for obtaining and specifying timing information that addresses at least the problems discussed above.

SUMMARY OF THE INVENTION

A method and system for presenting image data to a video output device is disclosed. One embodiment of the present invention sets forth a method, which includes the steps of queuing the buffer of image data for display, attaching an object to a command associated with presenting the buffer of image data, wherein the object is capable of storing timing information relating to executing the command, and enabling an application program to access the timing information.

One advantage of the disclosed method and system is to enable an application program to access timing information previously only accessible by a GPU driver and use the timing information for synchronization or system recovery purposes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
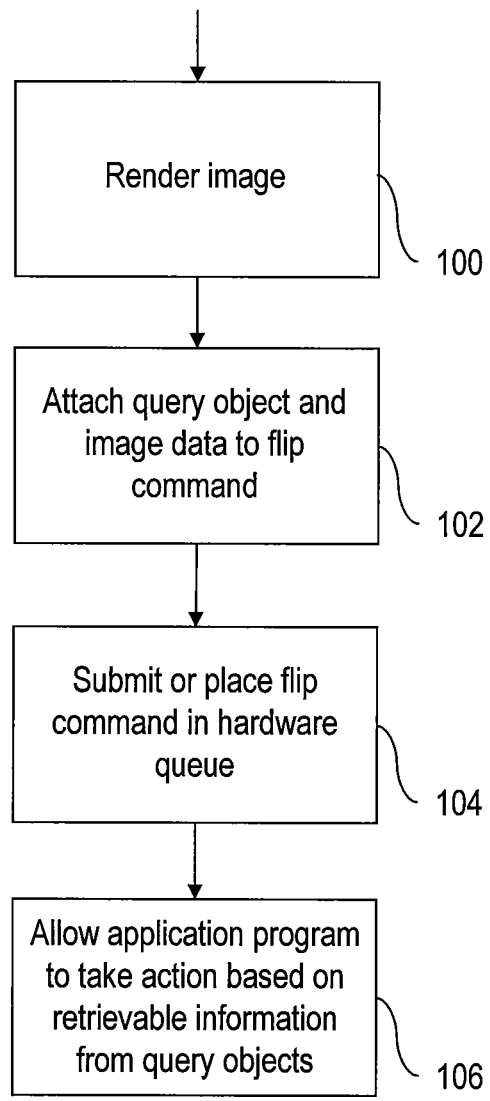
FIG. 1 is a flow diagram illustrating a sequence of steps enabled by a programming interface to configure a GPU in a graphics subsystem for presenting image data to a video output device, according to one embodiment of the present invention.

FIG. 1 is a flow diagram illustrating a sequence of steps enabled by a programming interface to configure a GPU in a graphics subsystem for presenting image data to a video output device, according to one embodiment of the present invention. Suppose an application program invokes API calls to cause the GPU to render images and then also to display the rendered image data. With the geometric primitives and the API calls from the application program, various stages of a graphics pipeline supported by the programming interface are invoked in step 100 to process the geometric primitives and store the rendered image data in a framebuffer. Instead of simply displaying each static frame buffer containing the rendered image data, in step 104, different buffers in the framebuffer, such as textures and renderbuffers, can be queued for display. In other words, the programming interface provides the application program with the flexibility to queue the rendered image data in these different buffers. Here, "textures" and "renderbuffers" are well-known software constructs, or objects, supported by the programming interface. In one implementation, one of these buffers is for colors; another is for stencil; and yet another is for depth. The buffers can also contain floating-point pixel data.

Prior to issuing the flip command the programming interface in step 102 attaches certain query objects with the command. Each query object is a software construct supported and tracked by the programming interface and is also accessible by the application program. As the query object traverses the hardware components of the graphics subsystem, the hardware components, such as the GPU, may store certain state information in it. Here, the attached query objects are configured to store the state information associated with the flip command, such as timing information. Because the query objects are accessible by the application program, the application program can carry out certain actions based on the information retrievable from the query objects in step 106. In one implementation, the programming interface is provided by a software driver, and the instructions of the software driver are executed by a host processing unit.

Figure 2:
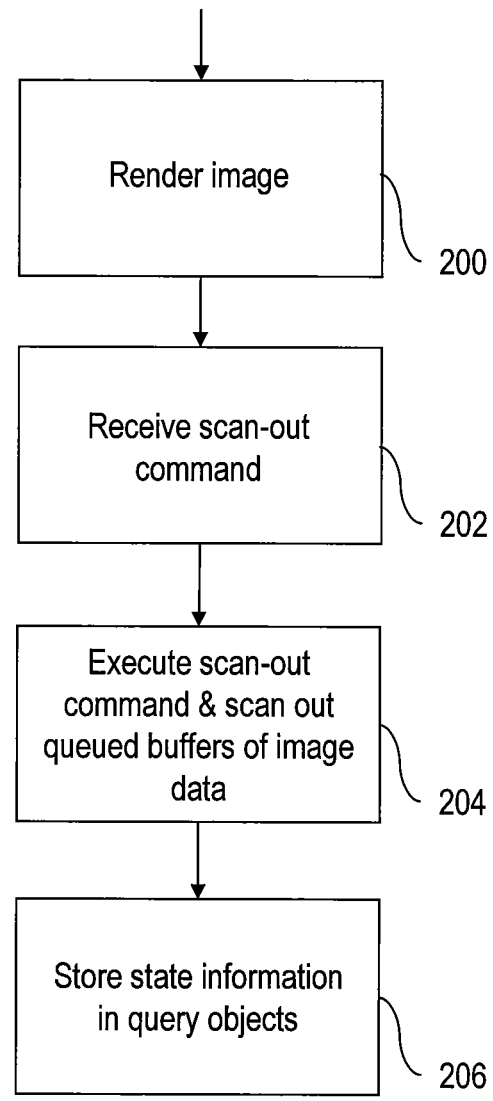
FIG. 2 is a flow diagram illustrating a sequence of steps performed by a GPU in response to the commands received from a programming interface, according to one embodiment of the present invention.

FIG. 2 is a flow diagram illustrating a sequence of steps performed by the GPU in response to the commands received from the programming interface discussed above, according to one embodiment of the present invention. In step 200, the GPU executes the commands associated with rendering of image data. After receiving the flip command in step 202, the GPU proceeds to execute the command and display the queued buffers of image data in step 204. As the GPU begins to execute the flip command, the GPU also stores certain state information, such as timing information, in the aforementioned query objects in step 206. It should be noted that the GPU performs the steps shown in FIG. 2 independently from the host processing unit carrying out the steps shown in FIG. 1.

Figure 3:
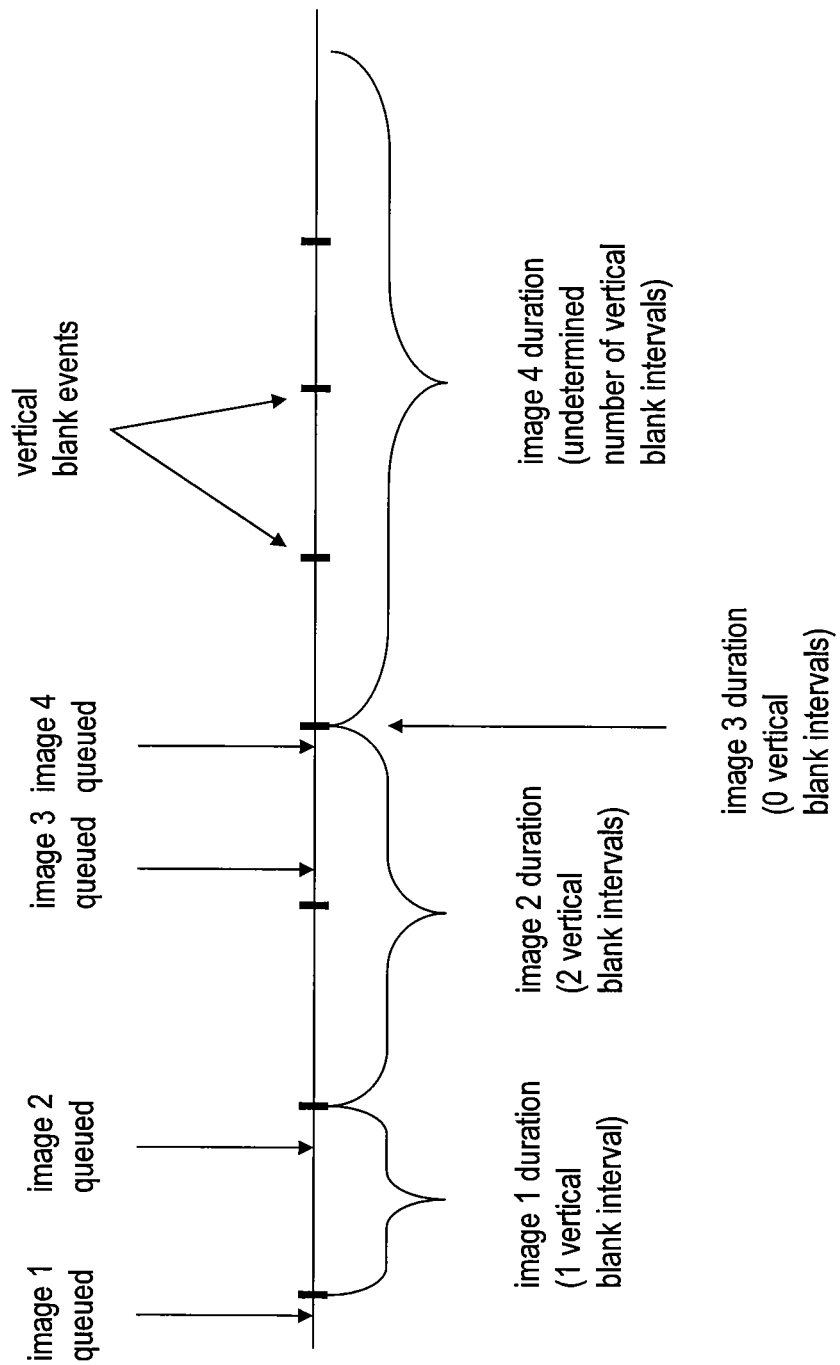
FIG. 3 illustrates one type of timing information made accessible to an application program, according to one embodiment of the present invention.

In one implementation, two query objects are attached to the flip command. A first query object is responsible for storing the time at which the GPU actually begins to display the queued buffers of image data (or otherwise referred to as the "start time"), and a second query object is responsible for storing the duration, a count of the number of the vertical blank intervals during which the image is displayed before the system begins displaying out the next image. FIG. 3 demonstrates four interesting cases. In the first case, the duration of image 1 is a single vertical interval time because image 2 is specified and queued by the application prior to the next vertical blank event and is subsequently displayed at the next vertical blank event. The specification of image 3 misses the next vertical blank event. As a result, the duration of image 2 is two vertical blank intervals. Image 4 is also specified prior to the next vertical blank event. As result, the duration of image 3 is 0 as image 4 is displayed at the next vertical retrace event. The duration of image 4 is then undetermined until the next image is specified. Furthermore, the total processing time for a frame in the system can be determined by querying the current time prior to submitting a frame and then subtracting this time from the display time returned in the first query object. This time to process a frame is then the sum of the following items: the amount of time for the application program to inform the programming interface that it is presenting this next image frame, the amount of time for the programming interface to interact with the GPU regarding the next image frame, the amount of time for the application program to specify the next image frame, and the amount of time for the GPU to execute the commands to render the next image frame.

Figure 4A:
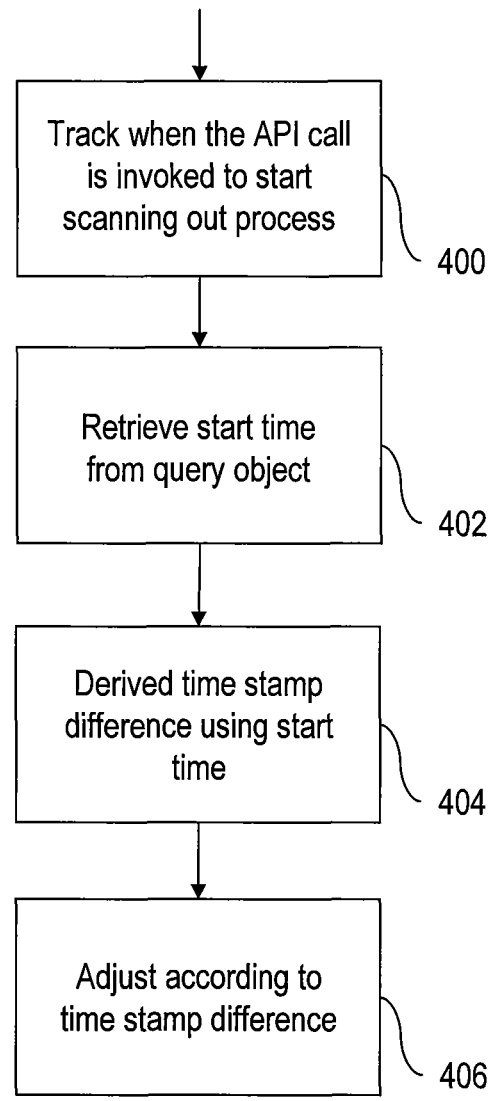
FIG. 4A is a flow chart illustrating the method steps of using the timing information retrieved from a first query object to synchronize image data and metadata from an external data source, according to one embodiment of the present invention.

FIG. 4A is a flow chart illustrating the method steps of using the timing information in the aforementioned first query object to synchronize image data and metadata from an external source, according to one embodiment of the present invention. Suppose the metadata is audio data, and suppose further that the GPU is responsible for processing both the image data and the audio data. In step 400, an application program tracks the time it first initiates an API call to instruct a graphics subsystem to flip to rendered image data. The application program then retrieves the start time from the first query object in step 402 and in step 404 establishes the time stamp difference between the initiating time tracked in step 400 and the retrieved start time. This time stamp difference is indicative of the responsiveness of the GPU, and the application program can then dynamically decide whether to throttle back or thrust forward the sending of the image data to the GPU according to the time stamp difference and as a result significantly improve the synchronization of the image data and the audio data.

Figure 4B:
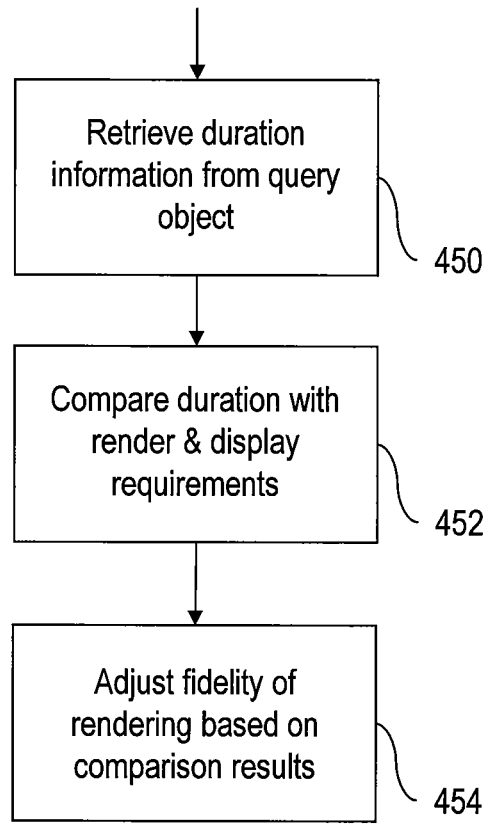
FIG. 4B is a flow chart illustrating the method steps of using the timing information retrieved from a second query object to adjust fidelity of rendering, according to one embodiment of the present invention.

FIG. 4B is a flow chart illustrating the method steps of using the timing information in the aforementioned second query object to adjust fidelity of rendering, according to one embodiment of the present invention. In step 450, the application program retrieves the duration information from the second query object. For each graphics subsystem, there are typically predetermined requirements imposed on it to render and display image data to a display device. The application program in step 452 compares such requirements with the duration information. Based on the comparison results, the application program adjusts the fidelity of rendering in step 454. For example, suppose the requirement imposed on the graphics subsystem is to render and display an image within a period of time T. If the retrieved duration exceeds T, indicating that the GPU is unable to meet the requirements and consequently may be dropping frames, then the application program dynamically reduces the fidelity of rendering to shorten the duration and in effect give the graphics subsystem a chance to meet the requirements.

Figure 5:
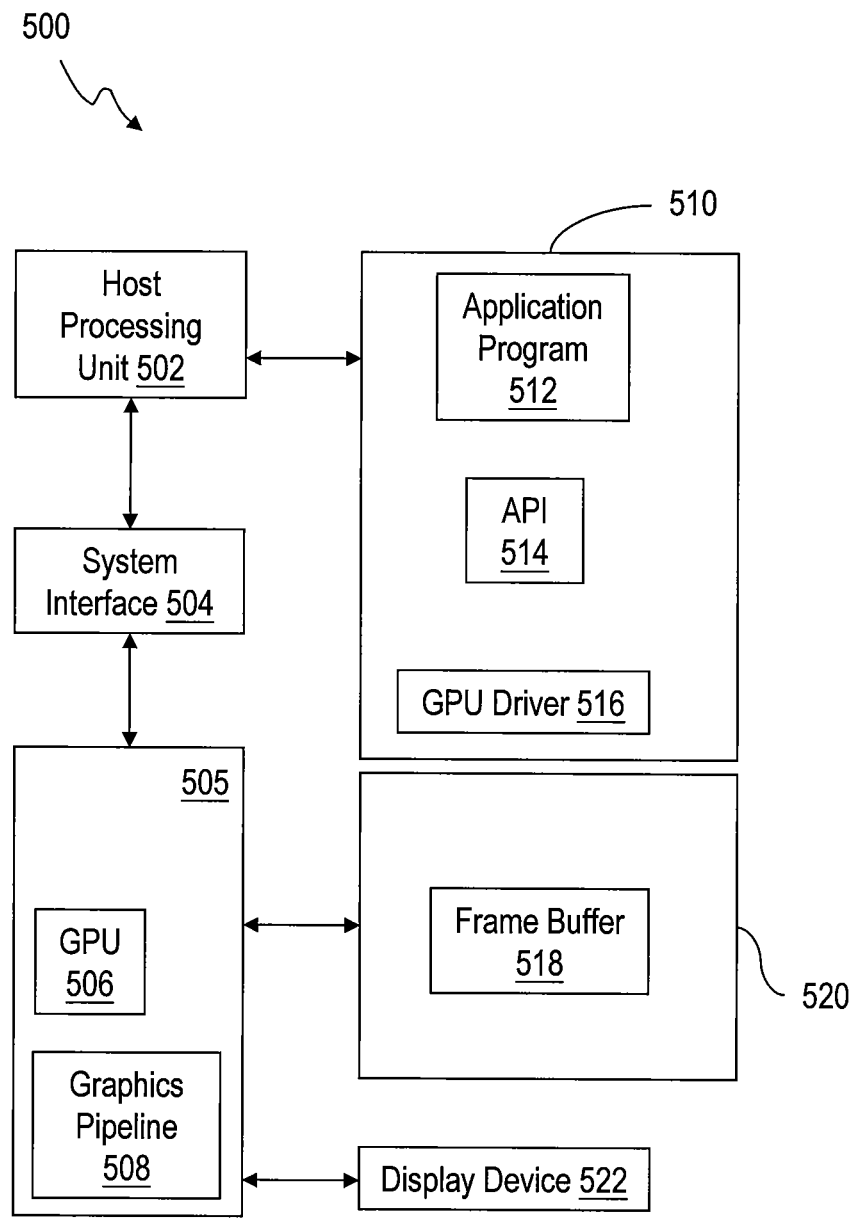
FIG. 5 is a conceptual diagram of a computing device configured to implement one or more embodiments of the present invention.

FIG. 5 is a conceptual diagram of a computing device 500 configured to implement one or more aspects of the present invention. The computing device 500 includes a host processing unit 502, a system interface 504, system memory 510, a graphics subsystem 505, including a GPU 506 and a GPU local memory 520, and a display device 522. The host processing unit 502 connects to the system memory 510 and system interface 504. The host processing unit 502 executes programming instructions stored in the system memory 510, operates on data stored in the system memory 510, and communicates with the GPU 506 in the graphics subsystem 505 through the system interface 504. In alternate embodiments, the host processing unit 502, the GPU 506, and the system interface 504, or any combination thereof, may be integrated into a single processing unit. Further, the functionality of the GPU 506 may be included in a chipset or in some other type of special purpose processing unit or co-processor. The system memory 510 typically includes dynamic random access memory (DRAM) configured to either connect directly to the host processing unit 502 (as shown) or alternately, via the system interface 504. The GPU 506 receives instructions transmitted by the host processing unit 502 and processes the instructions in order to render graphics and image data stored in the GPU local memory 520. The GPU 506 presents certain rendered image data stored in the GPU local memory 520 to the display device 522 for display. In other embodiments GPU memory (520) can be part of system memory (510).

Here, the system memory 510 includes an application program 512, an API 514, and a GPU driver 516. In one implementation, the API 514 corresponds to the programming interface discussed above and can be the OpenGL® API. The application program 512 generates calls to the API 514 in order to produce a desired set of results.

The GPU 506 includes a graphics pipeline 508 which, in one implementation, includes a vertex processing unit, a primitive processing unit, and a fragment processing unit. These processing units are configured to execute instructions to render a scene. The rendered image data are then stored in a frame buffer 518 in the GPU local memory 520.

The display device 522 is an output device capable of emitting a visual image corresponding to an input data signal. For example, the display device may be built using a cathode ray tube (CRT) monitor, a liquid crystal display, a plasma display, or any other suitable display system. In some instances, multiple display devices (e.g., an array of projectors or monitors) may be supported, with each display device displaying a portion of the image data.

The input data signal to the display device 522 is typically generated by scanning out the contents of one or more frames of image data that are stored in the framebuffer 518. In certain applications, GPU-generated and ancillary video signals need to be produced and transported at a high definition resolution. "High definition" generally refers to images having a resolution such as 1920 horizontal pixels by 1080 vertical pixels, regardless if interlaced or progressive scan. In such applications, converters are needed, such as serial digital interface (SDI) converters, to generate video images at high-definition resolutions from GPU-generated images.

It will be appreciated that the computing device 500 is illustrative and that variations and modifications are possible. The graphics subsystem 505 or any of its components may be implemented using one or more programmable processors programmed with appropriate software, application specific integrated circuits (ASICs), other integrated circuit technologies, or any combination of the above.

The above description illustrates various embodiments of the present invention along with examples of how aspects of the present invention may be implemented. The above examples, embodiments, and drawings should not be deemed to be the only embodiments, and are presented to illustrate the flexibility and advantages of the present invention as defined by the following claims. One embodiment of the invention provides a computer-readable medium containing a sequence of instructions for a programming interface, which when executed by a processing unit in a computing device, causes the processing unit to queue the buffer of image data for display, attach an object to a command associated with presenting the buffer of image data, where the object is capable of storing timing information relating to executing the command, and enable an application program configured to operate on the computing device to access the timing information.

We claim:

1. A method for presenting a buffer of image data to a video output device, the method comprising:
   queuing the buffer of image data for display;
   attaching an object to a command associated with presenting the buffer of image data, wherein the command is issued to a graphics processing unit (GPU) to cause the GPU to display the image data in the buffer; and
   enabling an application program, executing on a host processing unit, to access state information stored in the object by the GPU subsequent to the image data in the buffer being displayed by the video output device.

2. The method of claim 1, wherein the state information includes a start time stamp corresponding to beginning the execution of the command by the GPU.

3. The method of claim 2, wherein the state information includes a duration derived from the difference between the start time stamp and a subsequent start time stamp associated with a subsequent buffer of image data.

4. The method of claim 1, wherein the buffer is a renderbuffer object.

5. The method of claim 1, wherein the buffer is a texture object.

6. The method of claim 1, further comprising feeding back the state information to the application program asynchronously.

7. The method of claim 1, further comprising synchronizing processing metadata by the host processing unit with the display of the buffer of image data based on the state information stored in the object by the GPU.

8. The method of claim 1, wherein the video output device can be one of a plurality of video devices.

9. The method of claim 1, wherein the video output device is Serial Digital Interface (SDI) converter.

10. A computer-readable medium containing a sequence of instructions for a programming interface, which when executed by a host processing unit in a computing device, causes the processing unit to:
    queue the buffer of image data for display;
    attach an object to a command associated with presenting the buffer of image data, wherein the command is issued to a graphics processing unit (GPU) to cause the GPU to display the image data in the buffer; and
    enable an application program, executing on the host processing unit, to access state information stored in the object by the GPU subsequent to the image data in the buffer being displayed by the video output device.

11. The computer-readable medium of claim 10, wherein the state information includes a start time stamp corresponding to beginning the execution of the command by the GPU.

12. The computer-readable medium of claim 11, state information includes a duration derived from the difference between the start time stamp and a subsequent start time stamp associated with a subsequent buffer of image data.

13. The computer-readable medium of claim 10, wherein the buffer is a renderbuffer object.

14. The computer-readable medium of claim 10, wherein the buffer is a texture object.

15. The computer-readable medium of claim 10, further containing a sequence of instructions that, when executed by the host processing unit, causes the host processing unit to feed the state information back to the application program asynchronously.

16. The computer-readable medium of claim 10, further containing a sequence of instructions that, when executed by the host processing unit, causes the host processing unit to synchronize processing metadata by the host processing unit with the display of the buffer of image data based on the state information stored in the object by the GPU.

17. The computer-readable medium of claim 10, wherein the video output device can be one of a plurality of video devices.

18. The computer-readable medium of claim 10, wherein the video output device is Serial Digital Interface (SDI) converter.

19. The computer-readable medium of claim 10, wherein the programming interface conforms to the OpenGL® API.

20. A computing device configured to present a buffer of image data to a video output device, the computing device comprising:
- a host processing unit,
- a graphics processing unit (GPU) in a graphics subsystem, coupled to the video output device, and
- a system memory subsystem, wherein,
- the system memory subsystem contains a programming interface and an application program that, when executed by the host processing unit, causes the host processing unit to:
  - queue the buffer of image data for display;
  - attach an object to a command associated with presenting the buffer of image data, wherein the command is issued to the GPU to cause the GPU to display the image data in the buffer; and
  - enable the application program to access state information stored in the object by the GPU subsequent to the image data in the buffer being displayed by the video output device.

* * * * *